US009246754B2

(12) United States Patent
Jones et al.

(10) Patent No.: US 9,246,754 B2
(45) Date of Patent: Jan. 26, 2016

(54) AUTOMATIC FAILOVER OF NODES OF A MIDDLE-TIER LAYER

(71) Applicant: International Business Machines Corporation, Armonk, NY (US)

(72) Inventors: Robert C. Jones, Hursley (GB); Manuela Mandelli, Segrate (IT); Russell Wilson, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 14/094,824

(22) Filed: Dec. 3, 2013

(65) Prior Publication Data

US 2014/0164818 A1 Jun. 12, 2014

(30) Foreign Application Priority Data

Dec. 6, 2012 (GB) .................................. 1221937.4

(51) Int. Cl.
*G06F 11/20* (2006.01)
*H04L 12/24* (2006.01)
*H04L 29/14* (2006.01)

(52) U.S. Cl.
CPC ............ *H04L 41/0668* (2013.01); *H04L 69/40* (2013.01)

(58) Field of Classification Search
None
See application file for complete search history.

(56) References Cited

U.S. PATENT DOCUMENTS

| 6,381,617 | B1 |   | 4/2002  | Frolund et al.                 |
|-----------|----|---|---------|--------------------------------|
| 6,801,949 | B1 | * | 10/2004 | Bruck et al. ........... 709/232|
| 6,871,296 | B2 | * | 3/2005  | Kashyap .................. 714/13 |
| 6,934,875 | B2 | * | 8/2005  | Kashyap ................ 714/4.11 |
| 7,197,565 | B2 | * | 3/2007  | Abdelaziz et al. ......... 709/226|
| 7,647,422 | B2 | * | 1/2010  | Singh et al. .............. 709/238|
| 7,680,915 | B2 | * | 3/2010  | Still et al. ................ 709/223|
| 7,945,678 | B1 |   | 5/2011  | Skene                          |
| 2003/0051187 | A1 | * | 3/2003  | Mashayekhi et al. ......... 714/4 |
| 2006/0047836 | A1 |   | 3/2006  | Rao et al.                     |
| 2011/0131645 | A1 | * | 6/2011  | Johnson et al. ............. 726/12|
| 2012/0023361 | A1 | * | 1/2012  | Hammam et al. ........ 714/4.11 |
| 2012/0147883 | A1 | * | 6/2012  | Uttaro et al. .............. 370/389|

OTHER PUBLICATIONS

Intellectual Property Office Search Report, dated Apr. 22, 2013, regarding Application No. GB1221937.4, 3 pages.
Snoeren et al., "Fine-Grained Failover Using Connection Migration," Proceedings of the 3rd USENIX Symposium on Internet Technologies and Systems (USITS '01), Mar. 2001, 12 pages.
"Automatic Route Help," Sustainable Softworks, copyright 2000-2013, 5 pages. Accessed Sep. 16, 2012, http://www.sustworks.com/site/prod_ipnrx_help/html/AlternateRouteHelp.html.

* cited by examiner

*Primary Examiner* — Nadeem Iqbal
(74) *Attorney, Agent, or Firm* — Yee & Associates, P.C.; Parashos Kalaitzis

(57) ABSTRACT

Method and system are provided for automatic failover between multiple nodes in a middle-tier layer between client applications and a back-end service. The method at a first node includes: receiving a request from a client application; determining that the first node cannot service the request successfully; forwarding the request from the first node to a second peer node; receiving a response at the first node on completion of the request by the second peer node; and forwarding the response from the first node to the client application. An original path of communication between the client application and the first node is maintained. The failover of the request from the first node to the second peer node is transparent to the client application. Nodes may be registered in a group, wherein a node in a group has awareness of other nodes in the group.

19 Claims, 4 Drawing Sheets

AUTOMATIC FAILOVER OF NODES OF A MIDDLE-TIER LAYER

This application claims the benefit of priority to United Kingdom Patent Application Serial No. GB 1221937.4, filed on Dec. 6, 2012, the contents of which are hereby incorporated by reference.

FIELD OF INVENTION

This invention relates to the field of failure management of a middle-tier layer. In particular, the invention relates to automatic failover of nodes of a middle-tier layer.

BACKGROUND OF INVENTION

In three-tier networked topologies, the middle layer acts as a concentrator for many clients to share a finite resource at the back-end service. It can be used to protect the back-end systems by providing a level of indirection and hence a point of control.

In a highly available three-tier system, the middle tier can add further value by providing a single point of entry to client applications, thus hiding the complexity of the middle-tier and back-end implementation, both of which may be made up of multiple cloned nodes.

When the middle tier itself is made up of multiple cloned nodes, ultimately—one of those nodes will be elected to process a specific request. In certain circumstances, the middle-tier node, having received a specific request, might find that it is unable then to satisfy the request (e.g. within a target response time). This might occur if the selection of the specific middle-tier node coincides with a problem in the back-end node associated with this specific middle-tier node.

Having exhausted any chance to successfully process the request, the middle-tier node would typically respond to the client application associated with the request with an error. The client would then close and re-open its connection to the middle tier, in the expectation that an alternative middle-tier node would be selected.

An example of such a highly available three-tier system is a transaction system in which client applications access transaction servers via a transaction gateway. An example of such a transaction system is the IBM CICS® Transaction Server System (CICS is a trade mark of International Business Machines Corporation).

An external call interface (ECI) request is typically received and processed by a single gateway daemon. The path length and network resources used to successfully connect to and deliver an ECI request to a gateway daemon form a large "investment" in terms of response time, and CPU (Computer Processing Unit) load. Unfortunately, the successful delivery of an ECI request to a gateway daemon does not guarantee a successful onward delivery of the request to its intended destination (for example, a transaction server). This might be due to a temporary lack of capacity between the gateway daemon and transaction server, for example, all communication resources are busy.

Such failures can result in the entire connection from application to gateway daemon being torn down and subsequently being re-established, with the expectation that the new connection will deliver the request to an alternative gateway daemon, which does have the capacity to service the request. This failover pattern is an expensive process.

Therefore, there is a need in the art to address the aforementioned problems.

BRIEF SUMMARY OF THE INVENTION

According to a first aspect of the present invention there is provided a method for automatic failover between multiple nodes in a middle-tier layer between client applications and a back-end service, comprising a first node: receiving a request from a client application; determining that the first node cannot service the request successfully; forwarding the request from the first node to a second peer node; receiving a response at the first node on completion of the request by the second peer node; forwarding the response from the first node to the client application; wherein an original path of communication between the client application and the first node is maintained; and wherein the failover of the request from the first node to the second peer node is transparent to the client application.

The method may include registering a node in a group, wherein a node in a group has awareness of other nodes in the group. Registering a node in a group may include registering the node's availability and access details. The method may include establishing dedicated connections between peer nodes in a group utilizing optimized links where available. Establishing a connection may be carried out on a lazy basis when first needed.

The method may include the first node obtaining details of a peer node from a group registry of available peer nodes. The first node may select a peer node based upon the availability of dedicated connections.

The method may include: the first node requesting a peer node from a group registry of available peer nodes; and the group registry selecting a peer node from available peer nodes based on a selection criteria.

Forwarding the request from the first node to a second peer node may include forwarding all of the information in the correct form required to call a back-end service.

The method may include a second peer node: receiving a forwarded response from the first node; carrying out the service request at a back-end service; and responding to the first node with the outcome of the request. The second peer node may carry out the service request at a different back-end service resource to the back-end service resource that the first node attempted to use.

The middle-tier layer, in one embodiment, may be a transaction gateway between client applications and multiple transaction servers.

According to a second aspect of the present invention there is provided a system for automatic failover between multiple nodes in a middle-tier layer between client applications and a back-end service comprising: a middle-tier layer having multiple nodes registered in groups; wherein a failover mechanism is provided to forward a request received at a first node from a client application to a second peer node registered in the same group as the first node; wherein an original path of communication between the client application and the first node is maintained; and wherein the failover of the request from the first node to the second peer node is transparent to the client application According to a third aspect of the present invention there is provided a system for automatic failover between multiple nodes in a middle-tier layer between client applications and a back-end service, a middle-tier node operating as a first node comprising: a client request receiving component for receiving a request from a client application; a request servicing failure component for determining that the first node cannot service the request successfully; a first peer node forwarding component for: forwarding the request from the first node to a second peer node; receiving a response at the first node on completion of the request by the second peer node; and forwarding the response from the first node to the client application; wherein an original path of communication between the client application and the first node is maintained; and wherein the failover of the request from the first node to the second peer node is transparent to the client application.

The middle-tier node may perform the role of first or second peer node.

The system may include a registry mechanism for registering a node in a group, wherein a node in a group has awareness of other nodes in the group and for registering the node's availability and access details. The registry mechanism may include a peer connection establishing component for establishing dedicated connections between peer nodes in a group utilizing optimized links where available. The system may include the first node obtaining details of a peer node from the registry mechanism of available peer nodes. The peer connection establishing component may select a peer node based upon the availability of dedicated connections. The registry mechanism may be for receiving a request for a peer node from a first node and for selecting a peer node from available peer nodes based on a selection criteria.

A middle-tier node may include a peer node request receiving component for: receiving a forwarded response from the first node; carrying out the service request at a back-end service; and responding to the first node with the outcome of the request.

A second peer node may carry out the service request at a different back-end service resource to the back-end service resource that the first node attempted to use.

In one embodiment, the middle-tier layer may be a transaction gateway between client applications and multiple transaction servers.

According to a fourth aspect of the present invention there is provided a computer program product for automatic failover between multiple nodes in a middle-tier layer between client applications and a back-end service, the computer program product comprising: a computer readable storage medium readable by a processing circuit and storing instructions for execution by the processing circuit for performing a method according to the method of the first aspect.

According to a fifth aspect of the present invention there is provided a computer program stored on a computer readable medium and loadable into the internal memory of a digital computer, comprising software code portions, when said program is run on a computer, for performing the method of the first aspect.

According to a sixth aspect of the present invention there is provided a method substantially as described with reference to the figures.

According to a seventh aspect of the present invention there is provided a system substantially as described with reference to the figures.

The described aspects of the invention provide the advantage of avoiding the re-establishing of the connection between a client application and the middle tier for a given request in the event that the middle-tier node selected for the request is unable to process the request.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION OF THE DRAWINGS

Figure 1:
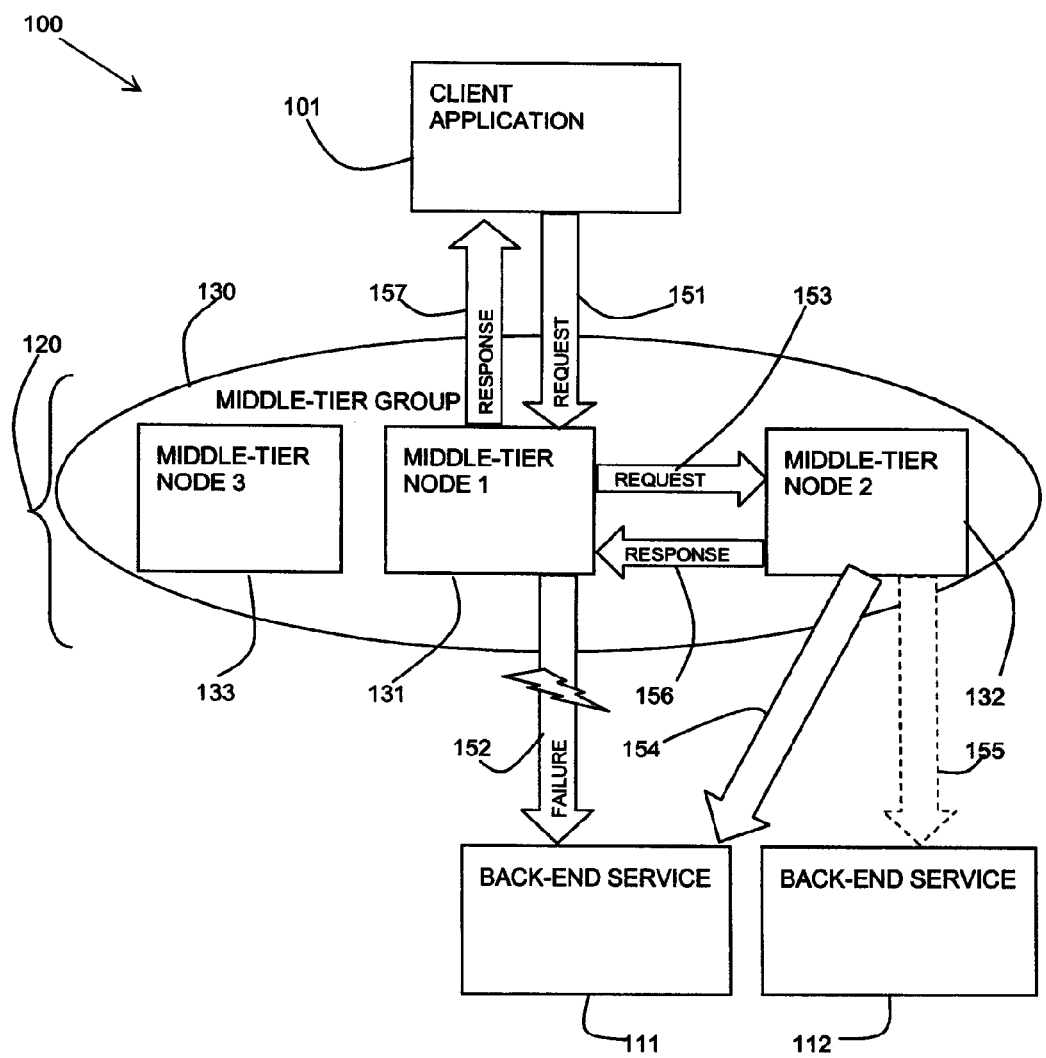
FIG. 1 is schematic block diagram of an example embodiment of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are described for providing an automatic failover of members of a middle-tier group (for example, a gateway group) in a three-tier topology. In the event that a middle-tier node selected for a request from a client application is unable to process the request, the described method avoids re-establishing the connection between the client application and the middle tier for a given request by automatically passing the request to another middle-tier node.

The investment already made in establishing the original connection between the client application and the middle-tier node persists when the middle-tier node finds it is unable to satisfy the request, and instead it directly selects a peer node to fulfil the request. The saving is achieved since peer nodes in the middle tier would have pre-established awareness of each other and inter-connectivity.

Any three-tier communications system might benefit from the invention, especially when the cost of establishing communication between tiers one and two is very high. For example, a long distance communications link with high latency may be considered (such as satellite data links), involving many network "hops" between the first and second tiers. The described method and system may apply to any three-tier system where there is investment in connection establishment, which may involve a significant path length through many network nodes (routers).

The "three-tier" does not exclude additional tiers also being provided.

An original client request is generally marshalled into a network form, transported over a network between tiers one and two to a specific middle-tier node, and then un-marshalled back into its original form. The original form is then marshalled into a form suitable for submission to the third tier. These two marshalled forms of the original request may be significantly different, but include details required to interact with the target in the third tier. For example, if the target in the third tier is a transaction server, the marshalled form may include: the target transaction system, the transactional program to invoke, and the input data to that program, security requirements, and transactional attributes.

In one example embodiment, the middle tier may be provided by a gateway group and the concept of a highly available gateway group may be extended such that any member of the group which finds it is unable to service a received client request may off-load the request directly to another member of the group. The failover to another gateway node may be transparent to the client application, as the connection between the client application and the gateway node is maintained thus saving the overhead of disconnection and re-connection. The path length, network resource and CPU load required in re-establishing a connection, re-flowing and de-marshalling the request a second time is avoided.

At the point at which a gateway node discovers that it is unable to service a request, it has all of the information in the correct form required to call a server. It has expended time and resource to obtain this information. Rather than discard the request and return an error, it may select a peer gateway node instance in the same gateway group and may forward the request to the peer gateway node. The original gateway node may then wait for a response from the peer gateway node before returning the response to the original caller client application.

Referring to FIG. 1, a block diagram shows an example embodiment of the described system 100. The system 100 is shown in the form of a three-tier system with one or more client applications 101 and one or more back-end services 111-112 with a middle tier 120 providing a single point of entry to client applications 101 hiding the complexity of the middle tier 120 and the back-end services 111-112.

A middle tier 120 may include one or more middle-tier groups 130 in which multiple middle-tier nodes 131-133 may be provided. The middle-tier group 130 provides a group of middle-tier nodes 131-133 in which the nodes have pre-established awareness and inter-connectivity. A node 131-133 may off-load a request from a client application 101 to another node 131-133 in the group. The failover to another node 131-133 may be transparent to the client application 101.

A middle-tier group 130 allows registry of the middle-tier nodes 131-133 during an initialization process including the establishment of dedicated connections between peer nodes 131-133. A shared convention for registration and discovery of peer middle-tier nodes may be based upon a common service providing get and set operations for name-value pairs. During initialization, a middle-tier node 131-133 may perform a registration to the common service whereby it would disclose such details required for interconnectivity by a peer middle-tier node 131-133, for example, an internet protocol (TCP/IP) (Transmission Control Protocol/Internet Protocol) host name and port number. It may also query the common service to obtain existing peer middle-tier nodes 131-133 of the group 130, retrieve the details required to establish inter-connectivity with peer nodes 131-133, and then use those details to establish interconnectivity with each active middle-tier node group node. If the middle-tier group 130 has a suitably unique means of identification, such as a group name, then a pre-determined naming convention on name/value pairs could be used to retrieve connection details of peer nodes, without explicitly knowing anything more than the group name.

Internet protocols such as TCP/IP technology may have communications between components with a close network proximity optimized by the networking software, reducing the exchange of information to cross-memory operations, or exploitation of dedicated hardware links where available. Middle-tier nodes in close proximity in terms of network latency, may optionally exploit any optimizations available between them for failover.

FIG. 1 illustrates a failover scenario using the block arrows. A request 151 is made by the client application 101 to a middle-tier node 1, 131. The client application 101 makes an investment in establishing the connection with the middle-tier node 1, 131. If the middle-tier node 1, 131 is unable to service the request, for example due to a failure 152 to connect to a back-end service 111, then the middle-tier node 1, 131 may forward the request 153 to a peer middle-tier node 2, 132 in a middle-tier group 130.

The peer middle-tier node 2, 132 may service 154 the request at the same back-end service 111 that the first middle-tier node 1, 131 tried, or an alternative 155 back-end service 112.

The peer middle-tier node 2, 132 may send a response 156 to the first middle-tier node 1, 131 upon completion of the service. The first middle-tier node 1, 131 may forward the response 157 to the client application 101.

Figure 2:
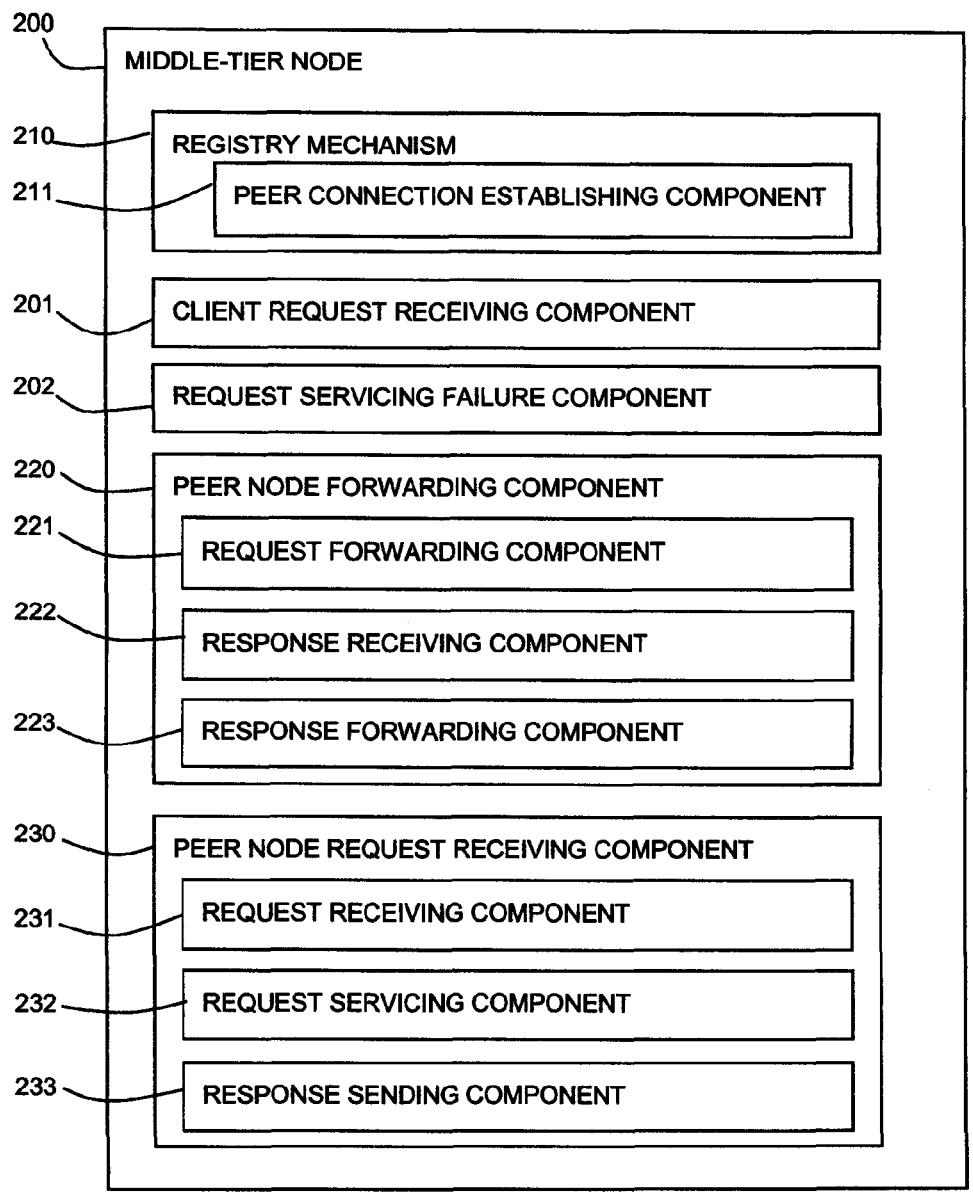
FIG. 2 is block diagram of an example embodiment of a system in accordance with the present invention.

Referring to FIG. 2, a block diagram shows an example embodiment of a described middle-tier node 200.

A middle-tier node 200 may include a registry mechanism 210 for registering the node's availability, group membership and access details during an initialization. The registry mechanism 210 may include a peer connection establishing component 211 for automatically establishing dedicated connections with other peer nodes within the same group using dedicated connections with each other, using optimized links (for example, Fast Local Sockets) where possible. Since off-loading a request to a peer node should be the exception rather than the rule, such connections may be established on a lazy basis upon first need.

The middle-tier node 200 may include a client request receiving component 201 for receiving a client request and a request servicing failure component 202 for determining if a request serviced by the node 200 has failed.

The middle-tier node 200 may include a peer node forwarding component 220 for handling requests that have failed at the node 200 by passing the request over to another peer node. The peer node forwarding component 220 may include a request forwarding component 221 for forwarding the request to the peer node, a response receiving component 222 for receiving a response from the peer node once it has serviced the request, and a response forwarding component 223 for forwarding the response to the requesting client application.

The middle-tier node 200 may also include a peer node request receiving component 230 for use in the event that the middle-tier node 200 is the peer node on the receiving end of a failover of a request originally sent to another node. The peer node request receiving component 230 may include a request receiving component 231 for receiving a forwarded request from another node, a request servicing component 232 for carrying out the request at a back-end service, and a response sending component 233 for sending a response back to the original node. A middle-tier node 200 may have a common client response component which incorporates the functions of the response forwarding component 223 of the peer node forwarding component 220 and the response sending component 233 of the peer node request receiving component 230.

Figure 3:
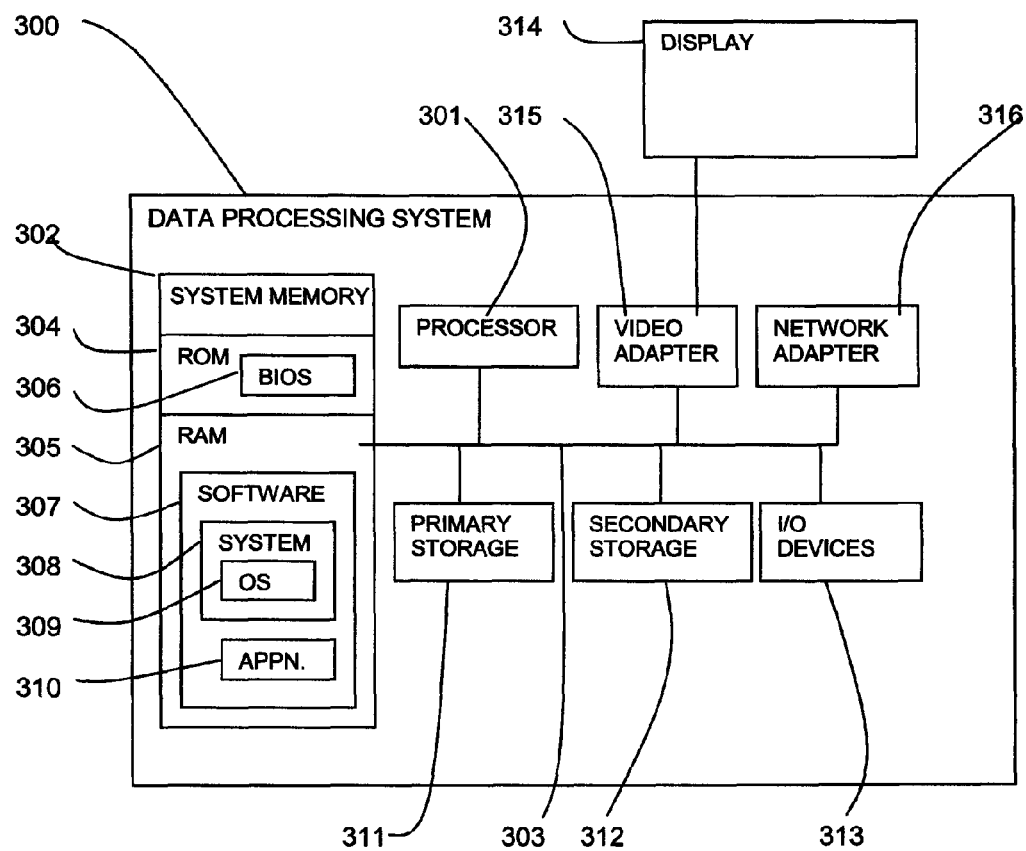
FIG. 3 is a block diagram of an embodiment of a computer system in which the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements may include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output (I/O) devices 313 may be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
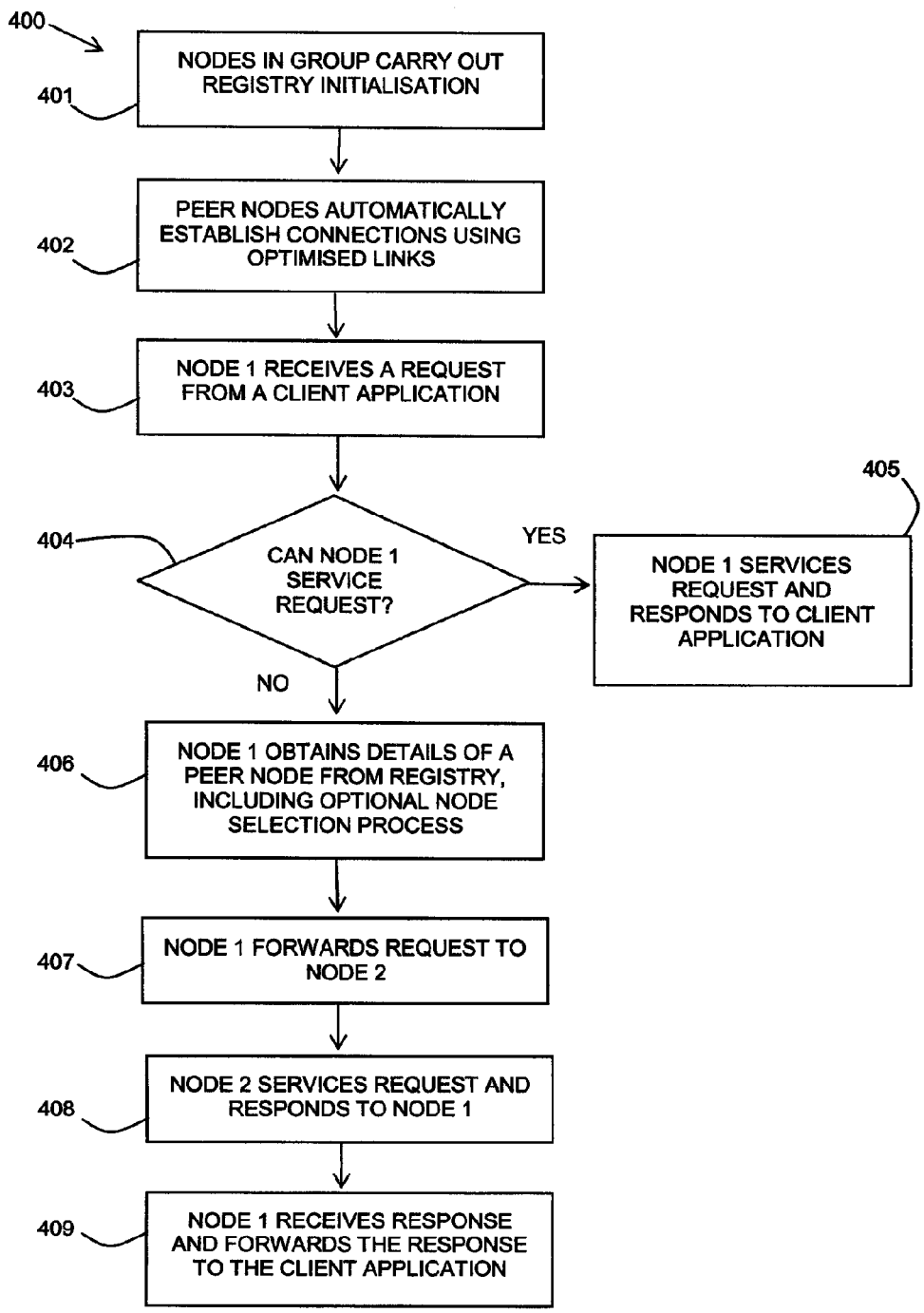
FIG. 4 is a flow diagram of an example embodiment of an aspect of a method in accordance with the present invention.

Referring to FIG. 4, a flow diagram 400 shows an example embodiment of the described method as carried out by a middle-tier node in a three-tier system.

Middle-tier nodes in a group may carry out registration during initialization 401, declaring themselves as peer nodes for which failover support is available between the nodes. Peer nodes may automatically establish connections 402, ideally using optimized links where available.

A node 1 may receive 403 a request from a client application. It is determined 404 if node 1 can service the request. This may be determined by node 1 trying to service the request and failing. There may be a target response time, which if not met, results in a determination that node 1 cannot fulfill the request.

If node 1 can service the request, it does so 405 and responds to the client application.

If node 1 cannot service the request, node 1 obtains details 406 of a peer node (node 2) from the registry. This process may optionally include a selection process at the registry for selecting the peer node.

Node 1 may forward 407 the request to node 2, for example, using the optimized link Node 2 may service 408 the request and may respond to node 1. Node 1 may receive the response and forward 409 it to the client application.

The original path of communications between the client application and node 1 is maintained, but the onward path is handed off directly to a peer node (node 2) which is transparent to the client application.

The failover to an alternative peer node may have the request satisfied by an entirely different destination.

In one implementation, the three-tier system may be a transaction system and the middle-tier may be provided by a gateway group of gateway daemons.

Gateway daemon instances within a highly available gateway group may become aware of each other through some registry mechanism (for example, shared storage, JNDI (Java Naming and Directory Interface) service). Gateway daemons may register their availability, group membership and access details during initialization.

As gateway daemon instances are initialised and registered, peers within the same group automatically establish dedicated connections with each other, using optimized links where possible (for example, Fast Local Sockets). Since offloading a request to a peer-gateway daemon should be the exception rather than the rule, such connections could be established on a lazy basis (upon first need).

In the event that one gateway daemon instance in the group finds it does not have the capacity to service a request, it may obtain the access details of an alternative gateway daemon within the group from the registry mechanism before forwarding the request to that gateway daemon. How an alternative peer is selected may be customizable, for example, round robin, a preferred gateway daemon instance, or based upon a relative measure of current ability to process a new request.

The failover to an alternative gateway daemon may have the request satisfied by an entirely different destination, for example, a transaction server may only be connected to the alternative gateway daemon, offering access to equivalent business logic.

A client request receiving component in the first gateway daemon instance may then wait for the response from the peer gateway daemon, rather than, as is usual, from one of their own request servicing components. Upon receiving the response, the response may be marshalled and sent back to the calling client application as usual.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD. (Digital Versatile Disk)

Improvements and modifications can be made to the foregoing without departing from the scope of the present invention.

The invention claimed is:

1. A method for automatic failover between multiple nodes in a middle-tier layer between client applications and a back-end service, comprising:
   registering a middle-tier node operating as a first node in a group, wherein the first node has awareness of other nodes in the group;
   receiving, at the first node, a request from a client application;
   determining that the first node cannot service the request successfully;
   forwarding the request from the first node to a second peer node registered in a same group as the first node;
   receiving a response at the first node on completion of the request by the second peer node;
   forwarding the response from the first node to the client application;
   the first node requesting a peer node from a group registry of available peer nodes; and
   the group registry selecting a peer node from available peer nodes based on a selection criteria;
   wherein an original path of communication between the client application and the first node is maintained;
   wherein failover of the request from the first node to the second peer node is transparent to the client application; and
   wherein registering the node in the group includes:
      registering the node's availability and access details.

2. The method as claimed in claim 1, further comprising:
   establishing dedicated connections between peer nodes in the group utilizing optimized links where available.

3. The method as claimed in claim 2, wherein establishing a connection is carried out on a lazy basis when first needed.

4. The method as claimed in claim 1, further comprising:
   the first node obtaining details of a peer node from a group registry of available peer nodes.

5. The method as claimed in claim 4, wherein the first node selects a peer node based upon an availability of dedicated connections.

6. The method as claimed in claim 1, wherein forwarding the request from the first node to the second peer node includes forwarding information in a correct form required to call the back-end service.

7. The method as claimed in claim 1, further comprising:
   receiving, by a second peer node, a forwarded response from the first node;
   carrying out a service request at a back-end service; and
   responding to the first node with an outcome of the request.

8. The method as claimed in claim 7, wherein the second peer node carries out the service request at a different back-end service resource than a back-end service resource that the first node attempted to use.

9. The method as claimed in claim 1, wherein the middle-tier layer is a transaction gateway between client applications and multiple transaction servers.

10. A system for automatic failover between multiple nodes in a middle-tier layer between client applications and a back-end service, comprising:
    a middle-tier layer having multiple nodes registered in groups; and
    a registry mechanism configured to register a node in a group, wherein the node has awareness of other nodes in the group and for registering the node's availability and access details;
    wherein a failover mechanism is provided to forward a request received at a first node from a client application to a second peer node registered in a same group as the first node;
    wherein an original path of communication between the client application and the first node is maintained;
    wherein failover of the request from the first node to the second peer node is transparent to the client application;
    wherein a middle-tier node operating as the first node comprises:
       a client request receiving component configured to:
          receive the request from the client application;
       a request servicing failure component configured to:
          determine that the first node cannot service the request successfully; and
       a first peer node forwarding component configured to:
          forward the request from the first node to the second peer node;
          receive a response at the first node on completion of the request by the second peer node; and
          forward the response from the first node to the client application; and
    wherein the registry mechanism is configured to receive a request for a peer node from a first node and for selecting another peer node from available peer nodes based on a selection criteria.

11. The system as claimed in claim 10, wherein the middle-tier node can perform a role of the first node or the second peer node.

12. The system as claimed in claim 10, wherein the registry mechanism includes a peer connection establishing component configured to establish dedicated connections between peer nodes in the group utilizing optimized links where available.

13. The system as claimed in claim 10, wherein the first node is configured to obtain details of a peer node from the registry mechanism.

14. The system as claimed in claim 12, wherein the peer connection establishing component selects a peer node based upon an availability of dedicated connections.

15. The system as claimed in claim 10, wherein a middle-tier node includes a peer node request receiving component that is configured to:
    receive a forwarded response from the first node;
    carry out a service request at a back-end service; and
    respond to the first node with an outcome of the request.

16. The system as claimed in claim 15, wherein the second peer node carries out the service request at a different back-end service resource than a back-end service resource that the first node attempted to use.

17. The system as claimed in claim 10, wherein the middle-tier layer is a transaction gateway between client applications and multiple transaction servers.

18. A computer program product for automatic failover between multiple nodes in a middle-tier layer between client applications and a back-end service, the computer program product comprising: a non-transitory computer readable storage medium readable by a processing circuit and storing instructions for execution by the processing circuit for performing a method according to claim 1.

19. A computer program stored on a non-transitory computer readable medium and loadable into an internal memory of a digital computer, comprising software code portions, when said program is run on a computer, for performing the method of claim 1.

* * * * *